(12) United States Patent
Lee et al.

(10) Patent No.: US 6,219,124 B1
(45) Date of Patent: *Apr. 17, 2001

(54) LIQUID CRYSTAL DISPLAY DEVICE WITH REDUCED RESISTANCE TO COMMON VOLTAGES, AND RELATED METHODS

(75) Inventors: Jung-hee Lee; Kweon-sam Hong, both of Kyungki-do (KR)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/838,727

(22) Filed: Apr. 10, 1997

(30) Foreign Application Priority Data

Apr. 10, 1996 (KR) .................................. 96-10756

(51) Int. Cl.[7] .................................................. G02F 1/1343
(52) U.S. Cl. ........................................... 349/147; 349/148
(58) Field of Search .................................. 349/147, 144, 349/148, 149, 51, 152

(56) References Cited

U.S. PATENT DOCUMENTS

| | | | |
|---|---|---|---|
| 5,285,300 | * 2/1994 | Suzuki et al. | 359/54 |
| 5,323,252 | * 6/1994 | Yoshida et al. | 359/54 |
| 5,717,475 | * 2/1998 | Kamio et al. | 349/147 |
| 5,825,439 | * 10/1998 | Noriyama | 349/152 |

* cited by examiner

*Primary Examiner*—William L. Sikes
*Assistant Examiner*—Dung Nguyen
(74) *Attorney, Agent, or Firm*—Myers, Bigel Sibley & Sajovec

(57) ABSTRACT

A liquid crystal display device that comprises a thin film transistor array panel including a voltage transfer circuit that includes a pad region for receiving a common voltage, a short region for transferring the common voltage, and a center region that connects the pad region to the short region. The center region includes a composite conductive layer comprising a first electrically conductive layer of a first resistance and a second electrically conductive layer of a second resistance, wherein the first resistance is less than the second resistance. The first electrically conductive layer of the composite conductive layer preferably comprises a material of relatively low resistance, such as aluminum or an aluminum alloy. In addition, the first electrically conductive layer may include an anodic oxide layer for inhibiting hillock formations. The liquid crystal display device further includes a color filter panel which includes a common electrode and a conductive member that electrically connects the common electrode to the short region of the thin film transistor array panel. In another embodiment, the first electrically conductive layer extends from the pad region to the short region and is exposed at either region. In yet another embodiment, the first electrically conductive layer extends from the center region to the short region where it is exposed at the short region.

4 Claims, 2 Drawing Sheets

LIQUID CRYSTAL DISPLAY DEVICE WITH REDUCED RESISTANCE TO COMMON VOLTAGES, AND RELATED METHODS

FIELD OF THE INVENTION

The present invention generally relates to display devices, and more particularly, to liquid crystal display devices.

BACKGROUND OF THE INVENTION

A liquid crystal display (LCD) typically includes a thin film transistor array panel, a color filter panel, and a liquid crystal layer sandwiched between the thin film transistor array and the color filter panel.

In this design, the thin film transistor array panel will generally include thin film transistors, pixel electrodes, gate lines and data lines. The color filter panel, on the other hand, will generally include color filters and a common electrode.

In operation, a gate electrode of a thin film transistor in the transistor array panel is supplied with a gate driving signal from a gate driver via a gate line which activates the thin film transistor. Therefore, a data signal applied to a source electrode of the thin film transistor from a data driver via a data line is supplied to the pixel electrode in order to switch the LCD pixel of the liquid crystal layer. In addition, the common electrode of the color filter panel is supplied with a common voltage through dummy pads of an out lead bonding (OLB) region and conductive members made of silver paste which are formed in the outer regions of the thin film transistor array panel. It is desirable that the paths through which the gate driving signals and common voltages pass have low resistivity in order to improve low voltage operation and reduced cross-talk. However, the paths of the common voltages encounter numerous resistances such as the contact resistance of the dummy pads, the resistance of the dummy pads themselves, the contact resistance of a common voltage driving circuit, the contact resistance of the conductive members connecting the dummy pads and the common electrode, and the resistance of the common electrode which is typically made of indium-tin-oxide (ITO). Several of these resistances are discussed in more detail below with reference to FIG. 1 which shows a cross-sectional view of a voltage transfer circuit from an OLB pad region to a short region that is connected to a common electrode.

In FIG. 1, a thin film transistor array panel includes a lower substrate 1 on which a gate insulating layer 3 is formed. A metal layer 5 which is connected to a data line is formed on the insulating layer 3. The metal layer 5 is typically made of chromium (Cr). A passivation layer 7 with two holes is formed on the metal layer 5, and an ITO layer 9 is formed thereover and connected to the metal layer 5 through the two holes. The thin film transistor array panel includes a dummy pad region B for receiving the external or common voltage and a short region A where a conductive member 11 electrically connects the thin film transistor array panel to the color filter panel. The color filter panel includes an upper substrate 19 covering a black matrix 13. Adjacent to the black matrix 13 is an overcoat layer 15. In addition, a common electrode 17 which is typically made of ITO is formed over the common electrode 17. Accordingly, the conductive member 11 contacts the ITO layer 9 of the thin film transistor array panel at the short region A and the common electrode 17 of the color filter panel, as shown.

When a common voltage supply from the common voltage driving circuit is applied to the dummy pad region B, the resulting voltage at the common electrode 17 is less than the applied common voltage because of the resistance in the pad region B having the structure of insulator/Cr/ITO layers, the resistance in the short region A having the structure of insulator/Cr/ITO layers, the resistance in a central region between the pad region B and the short region A having the structure of insulator/Cr/passivation/ITO layers, and the resistance in the conductive member 11. In particular, it is noted that the resistivity in the pad region B is relatively large due to its structure of the Cr/ITO layers. Further, the resistance from the center region to the short region A is relatively large due to the large resistivity of the chromium comprising the metal layer 5. As a result of the resistance to the common voltage, an increase in cross-talk may occur in the liquid crystal display. Thus, it would be desirable to be able to reduce the resistivity to the common voltage applied in order to reduce the presence of cross-talk in the LCD.

SUMMARY OF THE INVENTION

It is therefore an object of the present invention to provide a liquid crystal display (LCD) with decreased resistance to a common voltage applied to a common electrode of a color filter panel, and methods of forming same.

Another object of the present invention is to provide an LCD having reduced cross-talk, and methods of forming same.

Another object of the present invention is to provide an LCD having improved electrode and display characteristics, and methods of forming same.

These and other objects are provided in accordance with the present invention by LCD devices having voltage transfer circuits with preferred composite conductive layers. The composite conductive layer comprises a first electrically conductive layer of a first resistance and a second electrically conductive layer of a second resistance, wherein the first resistance is less than the second resistance. Thus, the overall resistance of the composite conductive layer is reduced by the lower resistance of the first layer. Therefore, material having a relatively high resistance but a favorable operational characteristic such as a favorable contact formation with indium-tin-oxide (ITO), can be utilized in the second conductive layer without significantly increasing the resistance of the composite conductive layer.

In a first embodiment of the present invention, a liquid crystal display device comprises a thin film transistor array panel, a color filter panel including a common electrode, and a conductive member that electrically connects the common electrode to the thin film transistor array panel. The thin film transistor array panel comprises a voltage transfer circuit that includes a pad region for receiving a common voltage, a short region for transferring the common voltage, and a center region that connects the pad region to the short region. The center region includes a composite conductive layer comprising a first electrically conductive layer of a first resistance and a second electrically conductive layer of a second resistance, wherein the first resistance is less than the second resistance.

The first conductive layer preferably comprises aluminum or an alloy thereof. As for the second conductive layer, it preferably comprises chromium (Cr), molybdenum (Mo), titanium (Ti), or tantalum (Ta). In addition, a liquid crystal display device may include an anodic oxide layer formed on the first conductive layer in order to reduce hillock formation.

In the first embodiment, the second conductive layer of the composite conductive layer extends from the pad region to the short region of the voltage transfer circuit. Further, an indium-tin-oxide (ITO) layer formed over the composite conductive layer contacts the second conductive layer at the pad region and the short region.

In a second embodiment, the first conductive layer extends from the pad region to the short region and is exposed in either region. Therefore, the conductive member contacts the first conductive layer at the short region in order to form the electrical connection to the common electrode of the color filter panel. At the pad region, the common voltage is applied directly to the first conductive layer. As with the first embodiment, an anodic oxide layer may be formed on the first conductive layer for inhibiting hillock formation.

In a third embodiment, the first conductive layer extends from the center region to the short region and the second conductive layer extends from the pad region to the center region. Further, an ITO layer is formed over the composite conductive layer in the pad region and the center region, and contacts the second conductive layer at the pad region. Again, an anodic oxide layer may be formed on the first conductive layer for inhibiting hillock formations.

Methods for fabricating liquid crystal display devices in accordance with the present invention comprise the following steps. A first step includes forming a thin film transistor array panel including a voltage transfer circuit that includes a pad region for receiving a common voltage, a short region for transferring the common voltage, and a center region that connects the pad region to the short region, wherein the center region includes a composite conductive layer comprising a first electrically conductive layer of a first resistance and second electrically conductive layer of a second resistance and wherein the first resistance is less than the second resistance. A second step includes forming a color filter panel including a common electrode. A third step includes forming a conductive member that electrically connects the common electrode to the short region of the thin film transistor array panel. In the above method, it is preferred that the first conductive layer of the composite conductive layer comprises aluminum or an alloy thereof. Further, the second conductive layer preferably comprises either Cr, Mo, Ti or Ta. In addition, another step may include forming an anodic oxide layer on the first conductive layer in order to inhibit hillock formations.

Other features and advantages of the present invention will become apparent to one with skill in the art upon examination of the following drawings and detailed description. It is intended that all such additional features and advantages be included herein in the scope of the present invention, as defined by the appended claims.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The elements of the drawings are not necessarily to scale, emphasis instead being placed upon clearly illustrating the principles of the present invention. Furthermore, like numbers refer to like elements throughout.

Figure 1:
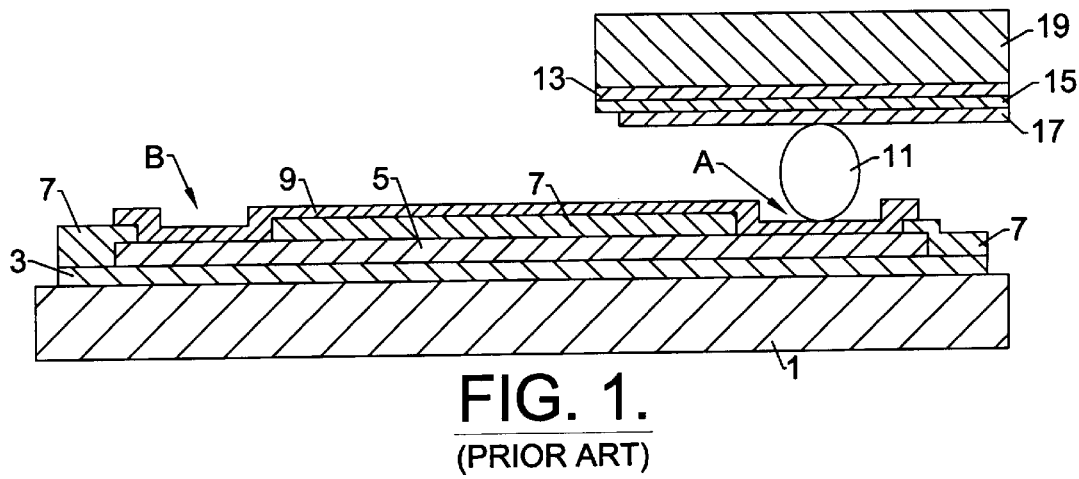
FIG. 1 is a cross-sectional view of a voltage transfer circuit of a liquid crystal display (LCD) in accordance with the prior art.
Figure 2:
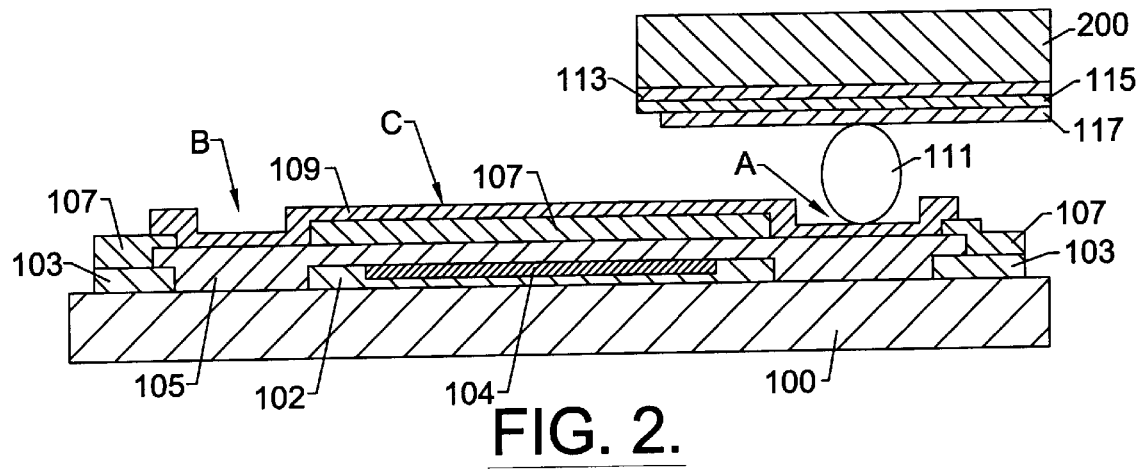
FIG. 2 is a cross-sectional view of a voltage transfer circuit of an LCD in accordance with a first embodiment of the present invention.

With reference to FIG. 2, a voltage transfer circuit of a liquid crystal display (LCD) device in accordance with a first embodiment of the present invention is illustrated. The voltage transfer circuit is formed on a lower substrate 100 and includes a short region A, a pad region B, and a center region C. The lower substrate 100 includes an active region (not shown) having thin film transistors and pixel electrodes, as is well known in the art. An example of a configuration of an active region of an LCD device can be found, for example, in U.S. Pat. No. 5,940,055 entitled "Liquid Crystal Displays With Row-Selective Transmittance Compensation And Of Operation Thereof", filed on Mar. 13, 1997 and having application Ser. No. 08/816,866 (Attorney Docket No. 5649-238), the disclosure of which is incorporated herein by reference as if set forth in full. An aluminum (Al) layer 102 is formed on the lower substrate 100 in a center region C. A gate insulating layer 103 is formed on the lower substrate 100 outside the pad region B and short region A. An aluminum oxide layer 104 (e.g., $Al_2O_3$) may be formed by anodic oxidation on the surface of the aluminum layer 102 in order to inhibit hillock formation. A chromium layer 105 is then formed over the aluminum layer 102 and the substrate 100 so as to cover the aluminum layer 102 and to contact the substrate 100 in the pad region B and the short region A, as shown. A passivation layer 107 is formed on the chromium layer 105 and is patterned to form two openings, one at the pad region B and one at the short region A. An indium-tin-oxide (ITO) 109 is then formed over the passivation layer 107 and the openings therein so as to contact and cover the chromium layer 105 in the pad region B and the short region A. A conductive member 111 is formed in the short region A to establish an electrical contact with a color filter panel. The color filter panel comprises an upper substrate 200, a black matrix 113, an overcoat layer 115, and a common electrode 117.

Thus, the chromium layer 105 and the aluminum layer 102 form a composite conductive layer for transferring the voltage received at the pad region B to the short region A where it is then transferred to the common electrode 117 via the conductive member 111. However, chromium has a relatively high resistance which can lead to an increased time constant (RC) delay associated with a data line and can reduce the maximum viewing angle of the display. Therefore, in order to decrease resistance in the voltage transfer circuit, the aluminum layer 102 of relatively lower resistance is provided in the center region C. The aluminum layer 102 is preferably separated from the ITO layer 109 by the chromium layer 105 above because it has been determined by the inventors herein that the use of a chromium layer to separate an ITO layer from an aluminum layer reduces the likelihood that parasitic aluminum oxide ($Al_2O_3$ clusters will form in the ITO layer in response to aluminum-metal migration.

These oxide clusters typically act as electrical insulators and increase contact resistance. As will be understood by those skilled in the art, these insulating clusters are typically formed when current passes through an aluminum/ITO contact and causes aluminum atoms to migrate into the ITO. This parasitic phenomenon is typically referred to as "metal migration". Accordingly, the chromium layer 105 extends from pad region B to the short region "A" and contacts the ITO layer 109 in both regions so that direct electrical contact between Al and ITO does not occur.

Figure 3:
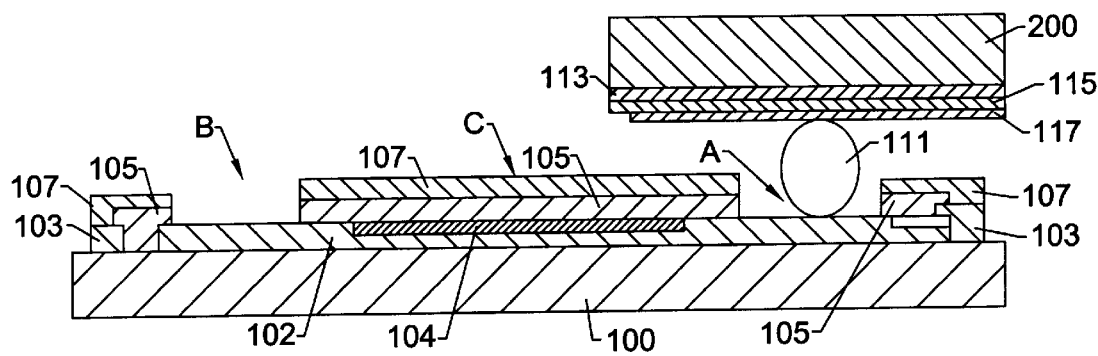
FIG. 3 is a cross-sectional view of a voltage transfer circuit of an LCD in accordance with a second embodiment of the present invention.

With reference to FIG. 3, a voltage transfer circuit of an LCD in accordance with a second embodiment of the present invention is illustrated. As shown, an aluminum layer 102, a portion of which is covered by an aluminum oxide layer 104, extends from a pad region B to a short region A. A chromium layer 105 is formed over the aluminum layer 102 and is patterned to expose the aluminum layer 102 in the pad region B and the short region A. A passivation layer 107 is then formed over the chromium layer 105 and is also patterned so as to expose the aluminum layer 102 in the pad region B and the short region A, as shown. In this embodiment, a connector member 111 contacts the aluminum layer 105 at the short region A and electrically connects the aluminum layer 105 to a common electrode 117 on an upper substrate 200. The composite conductive layer, as in the first embodiment, comprises the aluminum layer 102 and the chromium layer 105. Note, an ITO layer is not necessarily formed on the thin film transistor array panel in this embodiment.

Figure 4:
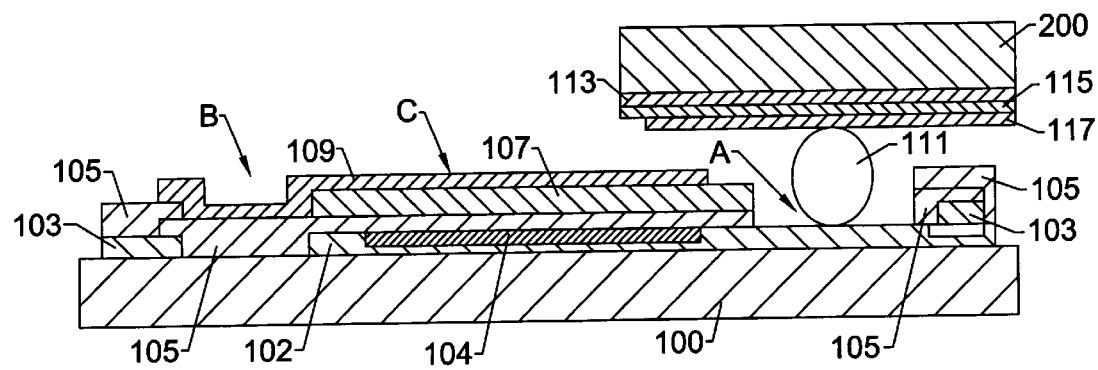
FIG. 4 is a cross-sectional view of a voltage transfer circuit of an LCD in accordance with a third embodiment of the present invention.

With reference to FIG. 4, a voltage transfer circuit of an LCD in accordance with a third embodiment of the present invention is illustrated. This embodiment is essentially a hybrid of the first and second embodiments wherein the pad region B and center region C are substantially identical to that of the first embodiment and the short region A is substantially identical to that of the second embodiment. Specifically, an aluminum layer 102 extends from a center region C to a short region A. A chromium layer 105, on the other hand, extends from a pad region B to the center region C. An ITO layer 109 extends from the pad region B to the center region C and contacts the chromium layer 105 at the pad region B. As with the first and second embodiments, the composite conductive layer comprises the aluminum layer 102 and the chromium layer 105.

It should be noted that for each of the above embodiments, the layer 105 may be formed from refractatory metals other than chromium, such as molybdenum (Mo), titanium (Ti) or tantalum (Ta). Also, layer 102 may be formed out of an aluminum alloy such as aluminum—neodymium alloy (Al—Nd).

A method for fabricating a liquid crystal display device in accordance with the present invention comprises the following steps. A first step includes forming a thin film transistor array panel including a voltage transfer segment that includes a pad region for receiving a common voltage, a short region for transferring the common voltage, and a center region that connects the pad region to the short region. The center region includes a composite conductive layer comprising a first electrically conductive layer of a first resistance and a second electrically conductive layer of a second resistance, wherein the first resistance is less than the second resistance. A second step includes forming a color filter panel that includes a common electrode. A third step includes forming a conductive member that electrically connects a common electrode to the short region of the thin film transistor array panel. In addition, another step may include the formation of an anodic oxidation layer on the first conductive layer.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquid crystal display device, comprising:

a thin film transistor array panel including a voltage transfer circuit that includes a pad region for receiving a common voltage, a short region for transferring said common voltage, a center region that connects said pad region and said short region, wherein said thin film transistor array panel includes a wire of a double-layered structure including an upper layer and a lower layer having lower resistance than that of the upper and directly formed on a substrate, a passivation layer having first and second contact holes respectively exposing said wire on said pad region and said short region, and a transparent conductive layer which is formed from said pad region to said short region and connected to said wire through said first and second contact holes, respectively;

a color filter panel including a common electrode; and a conductive member that electrically connects said common electrode of the color filter panel to said transparent conductive layer or the wire of said short region of said thin film transistor array panel.

2. The liquid crystal display of claim 1, wherein the upper layer comprises a material chosen from the group consisting of chromium, molybdenum, titanium and tantalum, and the lower layer comprises aluminum or aluminum alloy.

3. The liquid crystal display of claim 1, wherein said transparent conductive layer is made of indium tin oxide.

4. The liquid crystal display of claim 1, further comprising a gate insulating layer, which is formed on said substrate and is removed from said pad region to said short region.

* * * * *